July 27, 1948.  W. F. FROST  2,445,773
RATE TAKING CIRCUIT
Filed Jan. 22, 1944  2 Sheets-Sheet 1
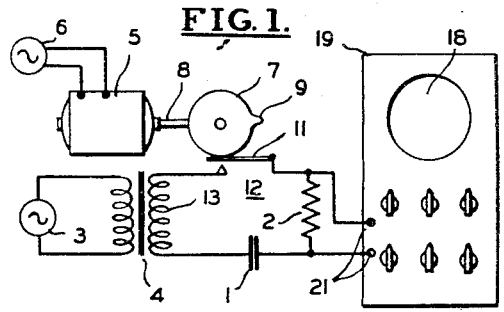
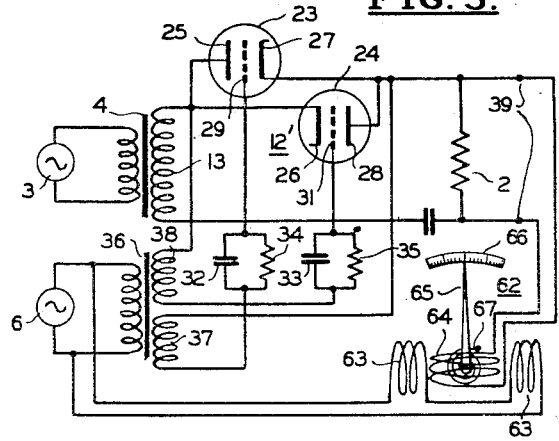
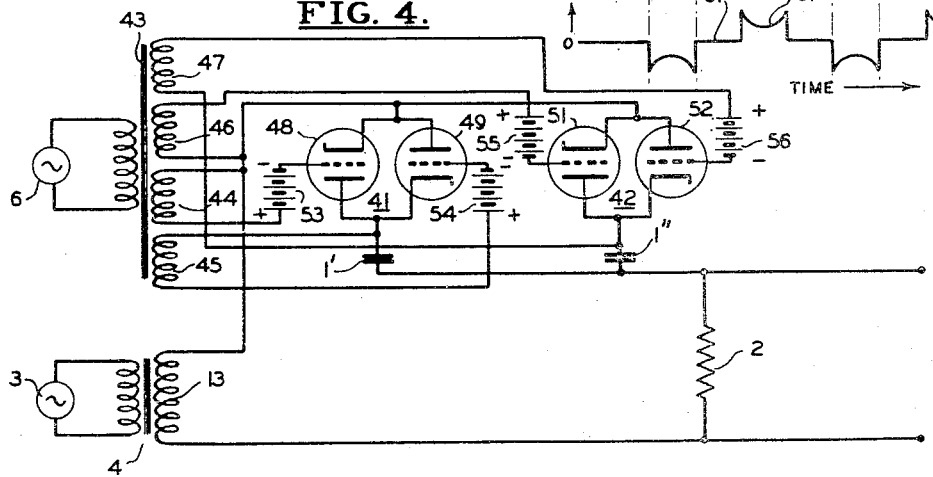
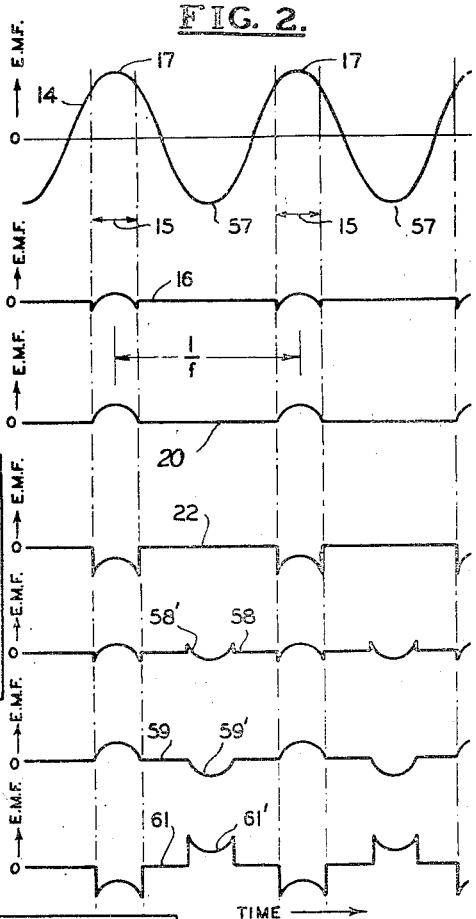
INVENTOR
WILLIAM F. FROST
BY Herbert H. Thompson
his ATTORNEY.

July 27, 1948.   W. F. FROST   2,445,773
RATE TAKING CIRCUIT
Filed Jan. 22, 1944   2 Sheets-Sheet 2
FIG. 5.
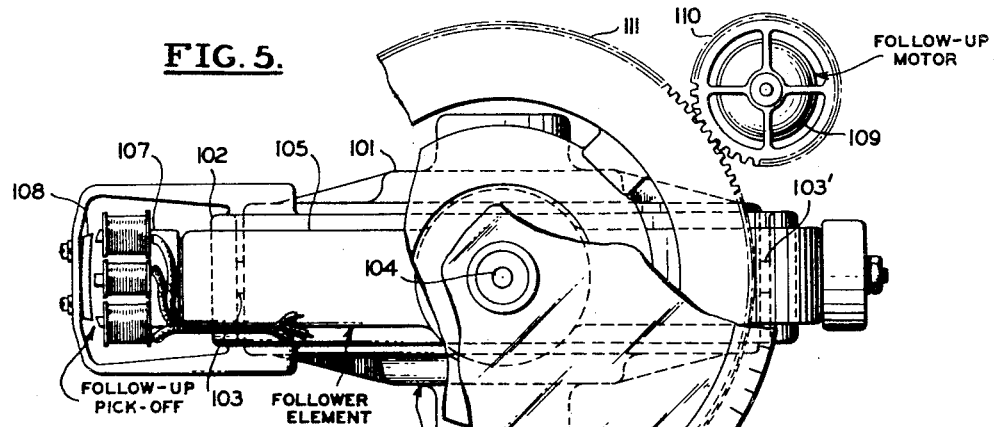
FIG. 6.
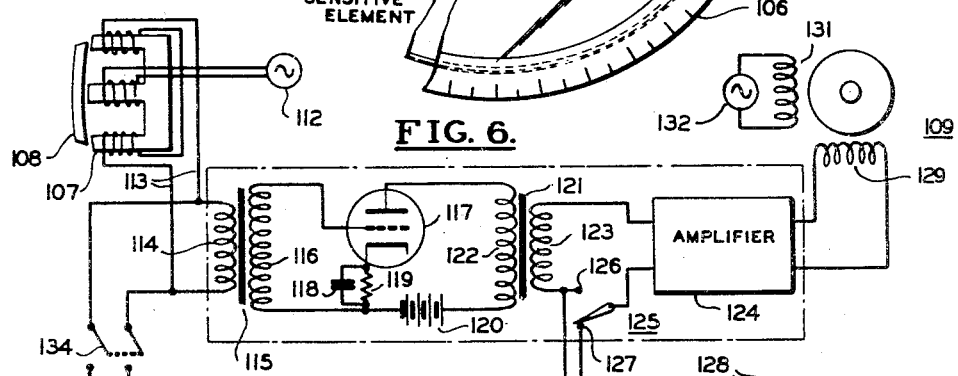
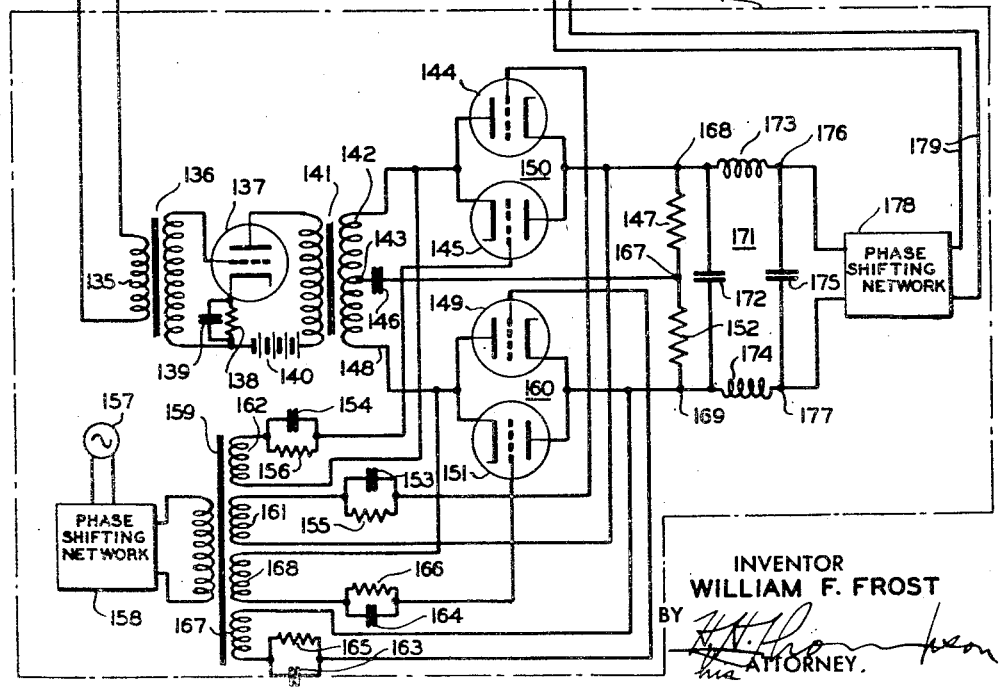
INVENTOR
WILLIAM F. FROST
BY
ATTORNEY.

Patented July 27, 1948

2,445,773

UNITED STATES PATENT OFFICE 2,445,773

RATE TAKING CIRCUIT

William F. Frost, Stewart Manor, N. Y., assignor to The Sperry Corporation, a corporation of Delaware Application January 22, 1944, Serial No. 519,291

19 Claims. (Cl. 318—31)

This invention relates to rate taking circuits, and particularly to rate circuits adapted for use with alternating current follow-up systems, remote position repeating systems, and the like.

Methods of deriving a voltage responsive to rate of change of a direct-current potential have long been known in the art. A combination of resistance and capacitance or of resistance and inductance, may be used for this purpose. Alternatively, a transformer having its primary winding arranged to conduct a direct current will, during a change of current intensity through the primary winding, develop a potential across the secondary winding indicative of the rate of change of the primary current.

In systems in which an alternating-current signal is produced by a sensitive positional pickoff, amplified, and applied to a reversible alternating-current follow-up motor, derivation of a rate responsive signal requires provision of special circuit means. One method by which rate measurement may be achieved in such an alternating-current system is by rectification and filtering to derive a direct potential proportional to the alternating voltage, and derivation of a signal proportional to the rate of change of the direct potential, as by use of a transformer as described above. A special amplifier may be connected to receive an input signal from the secondary of the rate transformer, and to deliver alternating-current output of phase and amplitude dependent on the input polarity and strength of the derived signal.

Such a system obviously requires a cumbersome series of steps for the transfer from alternating current to direct current, derivation of a rate responsive signal, and transfer from the direct-current rate indicative signal to a corresponding alternating-current output voltage. This system suffers a disadvantage, also, in the filtering step required after rectification, since such filtering limits the responsiveness of the rate circuit to very rapid changes of alternating-current signal amplitude.

It is an object of the present invention to provide improved means for measuring the rate of change of amplitude of alternating current or voltage.

It is a further object to provide improved means for deriving a reversible-phase alternating-current output signal indicative of the rate of change of amplitude of an alternating-current signal voltage.

Still another object is to provide a system for deriving a reversible-phase alternating-current output signal quickly responsive to a very rapid change of amplitude of an alternating-current input signal.

A further object is to provide a method of comparing the potential at the crest of an alternating voltage cycle with the potential at the crests of preceding cycles.

Further objects will appear evident from a study of the specification in connection with the drawings, of which:

Fig. 1 is a schematic diagram of a simple mechanical switching embodiment of the present invention;

Fig. 2 is a view of wave forms typical of the circuit arrangements of the present invention;

Fig. 3 is a schematic diagram of a simple version of the alternating-current rate responsive system employing an electron discharge switching device;

Fig. 4 is a schematic diagram of an alternative embodiment of the alternating-current rate responsive system of the present invention;

Fig. 5 is a plan view of a gyrocompass (partly broken away) embodying an alternating-current sensitive pick-off and follow-up motor; and Fig. 6 is a schematic circuit diagram of the gyrocompass alternating-current pick-off and follow-up motor, showing incorporation of a rate responsive system according to the present invention.

A simple version of the rate responsive system is shown in Fig. 1, wherein condenser 1 and resistor 2 are connected for supply from variable amplitude alternating-current source 3 through transformer 4. A synchronous motor 5 is connected to alternating-current source 6, the output of which is harmonically related with alternating-current source 3. By this it is meant that the output of source 3 is synchronous with the output of source 6, or some harmonic thereof, so that the output of source 6 serves as a reliable phase reference for the output of source 3. This requirement may be satisfied, for example, by supplying through different circuits or devices from a common main source, the voltages represented schematically as obtained from sources 6 and 3. Source 3 may be a primary power source, or a sensitive positional pick-off or other device, whereas source 6 is preferably a substantially constant amplitude source.

Motor 5 is arranged to drive cam 7 through shaft 8. Cam 7 is formed with a protruding tooth 9 adapted to cooperate with spring blade 11 of switch 12. This switch is connected in series with secondary 13 of transformer 4, to render momentarily conductive the circuit through condenser 1 and resistor 2. Cam 7 is rotatably adjusted on shaft 8 so that switch 12 is periodically rendered conductive during brief intervals corresponding with substantially maximum electromotive force across secondary 13 of transformer 4.

The alternating electromotive force wave developed in secondary winding 13 is represented at 14 in Fig. 2. During the time interval of conductivity of switch 12, schematically indicated at 15 in Fig. 2, current flow is permitted through transformer secondary 13, condenser 1 and resistor 2. If the amplitude of the alternating-current voltage delivered by source 3 is constant, the current wave through condenser 1, and accordingly the wave of voltage across resistor 2, is as represented by curve 16 of Fig. 2.

As illustrated in this curve, no current is permitted to flow through resistor 2 during the intervals between periods 15 of conductivity of switch 12. Since periods 15 are of finite length, preferably extending from a time corresponding to a few degrees before voltage peak 17 until a time corresponding to a few degrees of the cycle past peak 17, the voltage across condenser 1, if substantially constant, is greater than that across winding 13 at the beginning of conductivity period 15. Accordingly, current flow through resistor 2 at this time is in such a direction as to discharge condenser 1. Before peak voltage 17 is reached, however, the transformer secondary voltage exceeds the potential stored in condenser 1, and the current through resistor 2 reverses, flowing in the direction to increase the charge of condenser 1.

Near the end of the period of conductivity, the condenser voltage again exceeds the transformer secondary voltage, and another reversal of current through resistor 2 occurs, the current once more flowing in the direction of discharge of condenser 1. At the end of period 15, switch 12 is opened, and current flow through the series circuit of transformer secondary 13, condenser 1 and resistor 2 is arrested. Condenser 1 remains charged at a substantially constant direct potential except for very slight fluctuations during the period of conductivity of switch 12.

Thus, at the beginning of a period of conductivity the condenser is charged substantially as it was at the beginning of the preceding period of conductivity, if the amplitude of alternating-current source 3 is constant.

If the amplitude of the voltage wave supplied by source 3 is increasing, the charge retained by condenser 1 from preceding periods of conductivity will be such that the potential across the condenser will be less than the instantaneous electro-motive force of transformer secondary 13, at the beginning of the period of conductivity of switch 12. The current flow throughout conductivity period 15 will then be in the direction to increase the charge of condenser 1, as shown by curve 20.

By comparison of curves 20 and 16, it is seen that curve 17 contains an alternating component at the frequency of source voltage wave 14, while curve 16, representing no average net current in either direction during conductivity period 15, contains no alternating component at supply frequency. Such curves may be displayed on the fluorescent screen 18 of cathode-ray oscilloscope 19 by connection of vertical deflection terminals 21 to the terminals of resistor 2, as shown in Fig. 1.

If the amplitude of source 3 is decreasing, the charge of condenser 1 stored during preceding switching cycles will be so great that the potential across condenser 1 will exceed peak amplitude potential 17 of curve 14. In this case, the current flow through the series resistance and capacitance circuit throughout the period of switch conductivity will be in the direction of discharge of condenser 1. This is illustrated by curve 22. Note that this curve contains an alternating component at the frequency of sine wave 14, but of phase opposite to the phase of the fundamental-frequency alternating component in curve 20.

The strength of the fundamental alternating component of current through the series circuit of transformer secondary 13, condenser 1, resistor 2, and switch 12, and similarly of the fundamental alternating component of voltage across resistor 2, varies substantially as the rate of change of amplitude of the sinusoidal electromotive force wave produced in secondary 13 of transformer 4 by source 3. The phase of the fundamental alternating component of voltage across resistor 2 is indicative of the direction of change with respect to phase; i. e., whether the source amplitude is increasing or decreasing in the phase shown.

A rate responsive system is shown in Fig. 3 in which electronic tubes are used to replace the mechanical switching arrangement of Fig. 1. In order to prevent a rectifying action due to the cathode-to-anode electronic-conduction characteristic of the tubes, two tubes, 23 and 24, are employed in electronic switch 12'. These may be two separate vacuum tubes, or may be incorporated in a single vacuum envelope as a dual-triode tube, for example.

Anode 25 of tube 23 and cathode 26 of tube 24, are connected to one terminal of transformer secondary 13, replacing the fixed contact of switch 12. Cathode 27 of tube 23 and anode 28 of tube 24 are connected to one terminal of resistor 2, thus replacing the other contact element of switch 12. Control grids 29 and 31 of tubes 23 and 24, respectively, are provided with high negative bias with respect to the associated cathodes by a voltage drop across condensers 32, 33 and shunt resistors 34, 35 in a well-known manner.

Alternating-current source 6 harmonic with source 3 is connected to the primary of transformer 36. Secondary 37 of this transformer is connected in series with cathode 27, the parallel combination of condenser 32 and resistor 34, and grid 29, to apply a high-amplitude grid control voltage to tube 23. Secondary 38 of transformer 36 is similarly connected in series with the grid circuit consisting of condenser 33, resistor 35 and the cathode and control grid of tube 24. Secondaries 37 and 38 are so connected as to cause substantially equal amplitude, in-phase potential excursions of grids 29 and 31 with respect to cathodes 27 and 26, respectively.

Resistors 34 and 35 may be of the order of 1 megohm. These resistors and the shunt condensers bias the grids of tubes 23 and 24 to a negative potential nearly equal to the peak amplitude of the alternating electromotive force of windings 37 and 38. By virtue of the high-potential bias and the corresponding high amplitude alternating grid supply, the grid potentials of tubes 23 and 24 vary synchronously from substantially the potentials of cathodes 27 and 26, respectively, to very high negative potential with respect to cathodes 27 and 26.

In the very short interval during which the grids are at substantially the potentials of the respective cathodes, current will be permitted to flow through the anode-cathode circuit of either tube 23 or tube 24, dependent on the potential of anode 25 and cathode 26 with respect to cathode 27 and anode 28.

Thus, except for the slight internal resistance of that vacuum tube having its anode positive with respect to the cathode, and except for the somewhat more gradual commencement and termination of conductivity, vacuum tube switch 12' performs substantially the same function as mechanically operated switch 12.

Terminals 39 may be provided, connected to the ends of resistor 2, for connection to the grid circuit of an amplifier or for connection to the vertical deflection terminals of an oscilloscope, as shown in Fig. 1.

If desired, a dynamometer type galvanometer may be used for indicating the rate of change of input electromotive force supplied by source 3. Such an instrument is shown at 62 in Fig. 3, with field coils 63 connected to the terminals of source 6 and moving-coil 64 connected to terminals 39. Pointer 65 attached to moving coil 64, is normally positioned at midscale of calibration card 66 by hairspring 67. When an alternating electromotive force component at the frequency of source 6 is applied to moving coil 64, the direction and extent of deflection of pointer 65 from midscale position is indicative of phase and amplitude of the output of the rate responsive circuit, and therefore of direction and rate of change of electromotive force amplitude of source 3.

In Fig. 4 is shown a system in which are included two complete vacuum tube switches, 41 and 42, each switch being substantially equivalent to switch 12' in Fig. 2. Switch 41, including tubes 48 and 49, is connected in series with condenser 1', resistor 2, and transformer secondary 13. Switch 42, including tubes 51 and 52, is connected in series with condenser 1", resistor 2, and transformer secondary 13.

Harmonic switching control voltage source 6 is connected to the primary of transformer 43. Secondary windings 44, 45, 46 and 47 are connected in the grid-cathode circuits of vacuum tubes 48, 49, 51, and 52, respectively.

Battery 53 is connected to apply high negative potential to the grid of tube 48 with respect to the cathode. Batteries 54, 55 and 56 are similarly connected to bias tubes 49, 51 and 52, respectively. These batteries replace the parallel-connected resistor-condenser combinations such as 32, 34 of Fig. 3, as alternative means for biasing the grids of the tubes.

Secondary windings 46 and 47 of transformer 43 are connected to supply the grid circuits of tubes 51 and 52 in phase, and in opposite phase to the alternating grid supply of tubes 48 and 49. Thus, if curve 14 of Fig. 2 is representative of the electromotive force wave across secondary 13, and if switch 41 (comprising tubes 48 and 49 and the associated grid bias and alternating-current supply circuits) is arranged for conductivity through periods 15 in the vicinity of maximum positive electromotive force 17, then switch 42 (comprising tubes 51 and 52) will be operative during similar periods in the vicinity of negative peaks 57. Furthermore, condenser 1' in series with switch 41 may be charged to a potential nearly as great as that of the peak amplitude of wave 14, while condenser 1" in series with switch 42 will be charged to a similar potential of opposite polarity.

Since switch 42 is non-conductive when switch 41 is conductive, and switch 41 is non-conductive when switch 42 is conductive, the current through each switch and associated condenser must flow, in turn, through resistor 2. Negative pulses 58', 59' and 61' shown in curves 58, 59 and 61 in Fig. 2 are produced by the currents through resistor 2, contributed by the second vacuum tube switch, 42 and condenser 1". Condenser 1' permits comparison of the amplitudes of successive positive peaks 17 while condenser 1" permits comparison of successive negative peaks 57, so long as no phase reversal occurs in source 3.

For a given rate of change of amplitude of source 3, stronger output signal at fundamental frequency is provided by the circuit of Fig. 4 than by those of Figs. 1 or 3, and due to the fullwave character of the output, clearly shown by curves 59 and 61 in contrast to curves 20 and 22, less filtering is required to smooth into sinusoidal characteristics wave forms 59 and 61 provided by addition of the second synchronous switch and condenser.

A rate responsive circuit embodying the invention may be employed to advantage in a followup system such as the gyro-compass follow-up shown in Figs. 5 and 6.

Gyrocompass rotor case 101 is pivoted in phantom ring 102 for rotation about a horizontal axis on journals 103 and 103'. Vertical ring 102, in turn, is journaled about a vertical axis 104, the pivot bearings not being visible in this view. A follow-up element 105, rigidly connected to compass card 106 and arranged for rotation about vertical axis 104, carries wound element 107 of an "E" pick-off of a type well known in the art. Such a pick-off system is shown in Patent 1,959,804, to Wittkuhns et al., dated May 22, 1934, assigned to the assignee of the present invention. Armature element 108 of the pick-off is connected to vertical ring 102 for movement therewith. An alternating-current supply is connected to the central coil of wound element 107 of the pick-off and a reversible phase alternating-current signal is produced by the series-connected secondary windings upon relative positional deviation of armature 108 and wound element 107. This alternating-current signal is supplied to an amplifier system, the output of which supplies a direction-determining phase winding of followup motor 109. Motor 109 is connected through gears 110 and 111 to follow-up element 105 to drive the latter into azimuthal alignment with the vertical ring, and hence with the gyrocompass rotor axis.

The circuit arrangement through which positional deviation of pick-off elements 107 and 108 controls the operation of follow-up motor 109 is shown in Fig. 6.

Alternating-current source 112 is connected to the primary winding of "E" pick-off element 107. The output voltage from the series-connected secondary windings of pick-off element 107 is supplied through conductors 113 to primary 114 of input transformer 115. The secondary 116 of this transformer is connected to the control grid circuit of a conventional amplifier tube 117, provided with well known resistance-capacitance cathode biasing means 118 and 119, and anode potential source 120.

Output transformer 121 is provided with a primary winding 122 connected to receive the amplified output of tube 117; and secondary 123 of transformer 121 is arranged to supply an input signal to further amplifying means 124.

As shown, this signal may be applied directly to the input terminals of amplifier 124 by adjustment of the blade of single-pole, double-throw switch 125 to contact 126. Alternatively, switch 125 may be connected to contact 127 to include the output of rate circuit 128 in the signal applied to amplifier 124.

The output of amplifier 124 is connected to one phase winding 129 of two-phase follow-up motor 109, the other winding, 131 being supplied from an alternating-current source 132 synchronous with source 112. Sources 112 and 132 may, for example, be provided by connection to two phase circuits of a two-phase or three-phase supply line, with proper adjustment of the phase shift in amplifier 124.

Double-pole, single-throw switch 134 is arranged to connect pick-off output conductors 113 to the primary 135 of input transformer 136. Amplifier tube 137, biasing resistor 138 and shunt condenser 139, anode potential supply 140, and output transformer 141 serve in a well known manner to amplify alternating current signals obtained through conductors 113 and switch 134 from pick-off element 107.

Alternating-current output voltage provided by amplifier 137 between terminals 142 and 143 of output transformer 141 is applied to switch 150, incorporating vacuum tubes 144 and 145, through condenser 146 and resistor 147. Similarly, voltage of the opposite phase developed between output terminals 148 and 143 of transformer 141 is applied to switch 160 incorporating vacuum tubes 149 and 151, through condenser 146 and resistor 152. Vacuum tubes 144 and 145, connected back-to-back, form bi-laterally conductive switch 150 under control of alternating-current signals derived from source 157, phase shifting network 158, transformer 159 and secondaries 161 and 162. Source 157 is harmonically related with source 112. While separate sources 112 and 157 are schematically indicated, one single-phase common source may be employed for energizing the primary winding of element 107 and for supplying a switch timing signal to transformer 159 through phase shifting network 158. Alternatively, one phase circuit of a polyphase supply may be used to energize the primary winding of element 107, and another phase circuit of the supply may be used to energize transformer 159 through phase shifting network 158. Capacitors 153 and 154 serve to bias the control grid circuits of switching tubes 144 and 145 to a negative potential far exceeding cut-off bias for any reasonable anode potential. The potential across condensers 153 and 154 is developed by grid current flow through resistors 155 and 156, respectively.

Windings 161 and 162 of transformer 159 are so phased as to render tubes 144 and 145 simultaneously conductive through a brief interval in each cycle of the alternating-current wave applied through network 158 to the transformer 159. Tubes 149 and 151, connected back-to-back, serve as a second switch, 160, with grid circuits similarly biased by condensers 163 and 164 and resistors 165 and 166. These grid circuits are supplied by secondary windings 167 and 168 of transformer 159. Windings 167 and 168, mutually in phase, are phased oppositely to windings 161 and 162, so that switch 160 comprising tubes 149 and 151 is rendered conductive approximately 180° later than switch 150 comprising tubes 144 and 145. In this respect, rate responsive circuit 128 is closely similar to the circuit arrangement of Fig. 4.

Rate responsive system 128 is so arranged, however, that for a given rate of change of amplitude of the input signal applied to primary 135 of signal transformer 136, amplified and applied to transformer 141, the direction of current flow in resistor 147 with respect to junction 167 will be the same as the direction of flow through resistor 152 with respect to junction 167. A single storage condenser 146, is adapted to be charged by alternately timed currents through switches 150 and 160, and resistors 147 and 152, to a polarity dependent on the phase of the signal in the primary of transformer 136 with respect to the switch control voltage in the primary of transformer 159.

Due to the alternate currents through resistors 147 and 152, and to the relative directions of these currents as described above, the output electromotive force developed between terminals 168 and 169 of resistors 147 and 152 varies with time substantially as shown by curves 58, 59 and 61 of Fig. 2 for constant amplitude, increasing amplitude and decreasing amplitude, respectively, of signal electromotive force wave 14.

If desired, the waves of output electromotive force as illustrated at 58, 59 and 61 in Fig. 2 may be filtered, as by filter 171, to suppress alternating components at higher frequencies than the frequency of signal wave 14. Low-pass filter 171, comprises input shunt condenser 172, series inductors 173 and 174, and output shunt condenser 175 for cooperation in a well known manner to deliver a substantially sinusoidal output wave form. Output terminals 176 and 177 of filter 171 are connected to a variable phase-shift network 178, from which conductors 179 supply the rate-of-change responsive output signal to the input circuit of amplifier 124. Phase-shifting network 178 is provided for adjustment of the phase of the electromotive force wave across conductors 179 to offer maximum aiding or opposition to the amplified displacement signal developed across secondary 123 of output transformer 121.

If the relative displacement of elements 107 and 108 is increasing, the output electromotive force developed by rate-responsive system 128 is of such a phase as to be additive to the displacement signal produced in secondary winding 123 of transformer 121. If the relative displacement of elements 107 and 108 is decreasing, on the other hand, the phase of the rate responsive signal is in opposition to the signal developed in secondary 123, thus suppressing a tendency toward overshooting and hunting of motor 109.

While the gyrocompass follow-up system of Figs. 5 and 6 is shown as embodying a particular form of rate responsive circuit including two vacuum tube switches, it is obvious that any of the rate responsive circuits of Figs. 1, 3 and 4 is suitable for application in this system.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:
1. An electric system responsive to rate of change of alternating-current electromotive force derived from a signal source, comprising a reference source of alternating electromotive force harmonically related to said signal electromotive force, and a complex impedance connected to said signal source to provide a load therefor, said impedance including timed means harmonically responsive to said reference electromotive force for varying said impedance synchronously therewith, said impedance being uniformly responsive to currents in both directions therethrough.

2. An electric system responsive to rate of change of alternating electromotive force derived from a reversible phase signal source, comprising a reference source of substantially constant amplitude electromotive force harmonically related to said signal electromotive force, a complex impedance connected to said signal source to provide a bidirectional current-conducting load therefor, said impedance including means responsive to said reference electromotive force for varying said impedance synchronously with said reference electromotive force.

3. An electric system for generating alternating current electromotive force of phase and amplitude determined by rate of change of amplitude of an input comprising a source of alternating-current electromotive force, a bidirectional current carrying complex impedance load connected to said source, and means independent of direction of current flow in said load for alternately increasing and decreasing the bidirectional conductivity of said load harmonically with the alternating-current electromotive force from said source, whereby alternating currents are produced in said load in accordance with the rate of change of amplitude of said source.

4. An electric system responsive to rate of change of amplitude of an alternating-current signal comprising a complex impedance load, a signal source, circuit means connected to said source and said load for causing signal current to flow through said load, a source of substantially constant amplitude alternating-current electromotive force harmonic with said signal current, and periodically varying impedance means in said circuit operatively connected to said second source for impedance variation in accordance therewith said periodical impedance means providing a direct current potential in said load during periods of uniform amplitude signal electromotive force and an alternating current through said load during periods of changing amplitude of said signal.

5. Means for deriving an alternating-current electromotive force output of phase and amplitude dependent on direction and rate-of-change of amplitude of an alternating-current input signal comprising a source of alternating-current signal electromotive force, a harmonic source of reference electromotive force, a variable impedance device operatively connected to said reference source for impedance variation in synchronism therewith, series circuit means connecting said signal source to said variable impedance device, said circuit means including a reactance element and a resistance element, and means connected to said resistance element for operation in accordance with phase and amplitude of electromotive force produced across said resistance element during change of amplitude of said signal electromotive force.

6. A rate-of-change responsive electric circuit comprising a source of alternating-current signal electromotive force; a source of alternating-current reference electromotive force harmonic therewith; means connected to said reference source to produce impedance variations in accordance with the potential variations of said reference source; a series circuit including said signal source, said variable impedance means, and a substantially constant complex impedance; said variable-impedance means being adapted to store energy derived from a plurality of alternations of said signal electromotive force in the reactive portion of said complex impedance so that the net output alternating-current potential from the resistive component of said impedance varies in amplitude and phase in accordance with the rate of change of amplitude of said signal electromotive force.

7. In a method of deriving an alternating-current output electromotive force varying as the rate of change of an alternating-current signal electromotive force, the step comprising periodically rendering bilaterally conductive a complex impedance load circuit for said signal electromotive force, to produce a rectified energy storage in the reactance of said impedance and yield a resultant alternating-current electromotive force in the resistance of said impedance as a measure of said rate.

8. In a method of deriving an harmonic alternating-current output electromotive force varying as the rate of change of amplitude of an alternating-current signal electromotive force, the step of rendering bilaterally operative during intervals harmonically related with said signal alternating current a resistance-capacitance load circuit for said signal electromotive force to produce a capacitance storage potential for comparison with said signal electromotive force during said intervals.

9. In a system responsive to reversible-phase alternating current signals, a signal source, circuit means for deriving reversible-phase alternating-current output electromotive force varying as the rate of change of amplitude of said signals comprising complex impedance means including capacitance and resistance, bilaterally conductive switching means operated harmonically with said alternating-current signals, and circuit means connecting said impedance means, said source and said switching means whereby said signal alternating current is caused to flow through said impedance means during intervals permitted by said switching means.

10. Apparatus for determining the rate of change of the average amplitude of an alternating-current signal voltage comprising a source of alternating signal voltage, a reference source of harmonic alternating voltage, a complex impedance, circuit means connecting said impedance to said signal source, and means actuated by said source of reference signal for periodically increasing the conductivity of said circuit for predetermined intervals, said impedance being of such character that the current therethrough during said intervals of increased conductivity depends upon the difference of the average potentials of said source during successive intervals of increased conductivity.

11. A system for deriving an alternating-current output voltage varying in phase and amplitude according to the rate of change of an alternating signal voltage, comprising a source of alternating-current signal voltage, complex impedance means, said impedance means including reactance and resistance, circuit means connecting said source to said impedance, and means for periodically varying the bilateral conductivity of said circuit harmonically with the average frequency of said alternating signal voltage whereby the instantaneous current through said resistance is determined by the difference of potential of said reactance and said source during periods of maximum conductivity.

12. In a follow-up system, in combination with driven and controlling elements, an alternating current source, alternating-current pick-off means energized thereby and connected to said driven and controlling elements for delivering alternating-current signals of phase and amplitude dependent on direction and extent of relative positional deviation of said driven and controlling elements, follow-up driving means connected to said driven element and adapted to operate in direction and rate according to phase and amplitude of said alternating-current signals delivered by said pick-off means, and means for producing alternating-current output of phase and amplitude representative of the sense and magnitude of rate of change of peak amplitude of said alternating-current signals delivered by said pick-off means, said rate-of-change responsive means comprising a series circuit including capacitance and an impedance connected in series, means for applying a version of said alternating current signals delivered by said pick-off means to said series circuit, and means coupled to said source for varying the impedance of said series circuit synchronously with the alternating voltage supplied thereby connected to modify the controlling current of said follow-up driving means.

13. In a follow-up system, in combination with driven and controlling elements, an alternating current source, pick-off means supplied by said source, said pick-off means being connected to a first of said elements and adapted to cooperate with the second of said elements to produce an alternating-current output signal of phase and amplitude dependent on direction and extent of relative positional deviation of said elements, means for producing an alternating-current output signal of phase and amplitude dependent on the rate of change of amplitude of said alternating current signal, said last named means comprising complex impedance means and impedance changing means therein coupled to and synchronously variable with said alternating-current source, motive means for driving said driven element, and means for combining said rate-of-change dependent signal and said deviation-responsive signal to control said motive means.

14. An electric system for receiving an input alternating voltage and producing an output voltage varying in amplitude and phase according to the magnitude and phase sense of rate of change of amplitude of the input voltage, comprising a capacitor, bilaterally conductive switching means for applying the input alternating voltage to said capacitor during recurrent intervals of passage of the input voltage wave through the maximum voltage parts thereof, and means in series with said capacitor for producing output voltage varying according to current variations through said capacitor and said switching means.

15. An electric system for receiving an alternating input voltage and producing an alternating output voltage varying in amplitude and phase according to the rate of change of amplitude of the input voltage and the phase thereof, comprising an output impedance, a capacitor and recurrent switching means connected in series therewith, said switching means being alternately substantially non-conductive and bilaterally conductive at the frequency of said input voltage, and means for applying said input alternating voltage to said series-connected output impedance and capacitor and switching means.

16. An electric system for receiving an alternating input voltage and producing an alternating output voltage varying in amplitude and phase according to the rate of change of amplitude of the input voltage and the phase thereof, comprising an output impedance, a capacitor and recurrent switching means connected in series with said output impedance, said recurrent switching means being alternately non-conductive and bilaterally conductive, timing means coupled to said switching means for rendering the bilaterally conductive intervals substantially coincident with the passage of the input voltage wave through the maxima, and means for applying said input alternating voltage to said series-connected output impedance and capacitor and switching means.

17. A system as defined in claim 16, wherein said switching means comprises first and second electron discharge devices each having a cathode, an anode, and a control electrode, means connecting the anode of the first device to the cathode of the second and connecting the cathode of the first device to the anode of the second, and means normally biasing the control electrode with respect to the cathode of each of said devices for preventing electronic conduction between the anodes and cathodes.

18. A system as defined in claim 17, wherein said timing means comprises transformer means coupled to said control electrodes and said cathodes for applying to said electrodes positive voltage impulses for recurrently overcoming said biasing means and rendering said devices conductive.

19. A system as defined in claim 16, wherein said switching means comprises a switch and a synchronous motor coupled thereto.

WILLIAM F. FROST.

REFERENCES CITED

The following references are of record in the file of this patent:

UNITED STATES PATENTS

| Number | Name | Date |
| --- | --- | --- |
| 1,554,698 | Alexanderson | Sept. 22, 1925 |
| 2,025,749 | Hubbard | Dec. 31, 1935 |
| 2,088,654 | Hull | Aug. 3, 1937 |
| 2,307,503 | Gulliksen | Jan. 5, 1943 |
| 2,375,159 | Wills | May 1, 1945 |